(12) United States Patent
Avary et al.

(10) Patent No.: US 10,586,207 B2
(45) Date of Patent: *Mar. 10, 2020

(54) AUTOMATIC CONNECTED VEHICLE DEMONSTRATION PROCESS

(71) Applicant: Aeris Communications, Inc., San Jose, CA (US)

(72) Inventors: Michelle Lynne Avary, Menlo Park, CA (US); Henry Plager, Mountain View, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,548

(22) Filed: Nov. 2, 2017

(65) Prior Publication Data

US 2018/0060807 A1    Mar. 1, 2018

Related U.S. Application Data

(63) Continuation-in-part of application No. 14/927,258, filed on Oct. 29, 2015, now abandoned.

(Continued)

(51) Int. Cl.
    *G06Q 10/08*      (2012.01)
    *H04L 29/08*      (2006.01)
(Continued)

(52) U.S. Cl.
    CPC .......... *G06Q 10/087* (2013.01); *G06F 21/10* (2013.01); *G06F 21/629* (2013.01); *G06Q 30/0185* (2013.01); *H04L 63/08* (2013.01); *H04L 63/10* (2013.01); *H04L 63/20* (2013.01); *H04L 67/02* (2013.01); *H04L 67/025* (2013.01);
(Continued)

(58) Field of Classification Search
    CPC ... G06Q 30/0185; H04L 63/08; H04L 67/306; H04W 60/06
See application file for complete search history.

(56) References Cited

U.S. PATENT DOCUMENTS 5,635,693 A * 6/1997 Benson ................. G08G 1/127
    340/10.33
6,868,389 B1 * 3/2005 Wilkins ............. G06Q 30/0201
    705/1.1

(Continued)

OTHER PUBLICATIONS

PCT International Search Report and Written Opinion of the International Searching Authority, dated May 20, 2016, application No. PCT/US2015/58411.

(Continued)

*Primary Examiner* — Joseph P Hirl
*Assistant Examiner* — Sayed Aresh Beheshti Shirazi
(74) *Attorney, Agent, or Firm* — Brundidge & Stanger, P.C.

(57) ABSTRACT

The present invention is directed toward an automatic connected vehicle demonstration method and system for automatically designating any registered vehicle as a demonstrator vehicle, and further allowing for the demonstrator vehicle to also have one or more subscription-based events based on demonstrator vehicle status. In one more embodiments, a computer implemented method provides for registering, deregistering, and managing a dealer's inventory of demonstration vehicles.

22 Claims, 8 Drawing Sheets

Related U.S. Application Data (60) Provisional application No. 62/073,667, filed on Oct. 31, 2014.

(51) Int. Cl.

| | | |
|---|---|---|
| *H04W 12/02* | (2009.01) | |
| *H04L 29/06* | (2006.01) | |
| *G06Q 30/00* | (2012.01) | |
| *H04W 12/06* | (2009.01) | |
| *G06F 21/62* | (2013.01) | |
| *H04W 12/08* | (2009.01) | |
| *H04W 12/12* | (2009.01) | |
| *G06F 21/10* | (2013.01) | |
| *H04W 4/44* | (2018.01) | |
| *H04W 12/00* | (2009.01) | |

(52) U.S. Cl.
CPC .............. *H04L 67/04* (2013.01); *H04L 67/18* (2013.01); *H04L 67/20* (2013.01); *H04L 67/306* (2013.01); *H04W 12/02* (2013.01); *H04W 12/06* (2013.01); *H04W 12/08* (2013.01); *H04W 12/12* (2013.01); *H04W 4/44* (2018.02); *H04W 12/00503* (2019.01); *H04W 12/00512* (2019.01)

(56) References Cited

U.S. PATENT DOCUMENTS

| | | | |
|---|---|---|---|
| 7,126,457 B1 | 10/2006 | Fourie et al. | |
| 7,251,473 B2 * | 7/2007 | Alrabady | B60R 25/24 340/426.1 |
| 8,267,317 B1 * | 9/2012 | Gulli | G06Q 20/387 235/385 |
| 8,588,991 B1 | 11/2013 | Forbes, Jr. | |
| 8,868,458 B1 * | 10/2014 | Starbuck | G06Q 40/00 705/35 |
| 2002/0186144 A1 * | 12/2002 | Meunier | G07B 15/00 340/4.6 |
| 2003/0200406 A1 * | 10/2003 | Kouno | G06F 12/1433 711/164 |
| 2004/0177032 A1 | 9/2004 | Bradley | |
| 2005/0072842 A1 * | 4/2005 | Yamagiwa | G06Q 10/08 235/375 |
| 2005/0139664 A1 * | 6/2005 | Yamagiwa | G06Q 30/02 235/385 |
| 2005/0283284 A1 * | 12/2005 | Grenier | G01C 21/26 701/31.4 |
| 2006/0003762 A1 * | 1/2006 | Sumcad | H04H 20/51 455/428 |
| 2006/0004488 A1 * | 1/2006 | Sugiyama | G06Q 30/02 700/245 |
| 2007/0214063 A1 | 9/2007 | Kahlon | |
| 2007/0237610 A1 | 10/2007 | Uribe | |
| 2007/0282738 A1 * | 12/2007 | Highbloom | G06Q 20/10 705/38 |
| 2008/0203145 A1 * | 8/2008 | Martins | G06Q 20/20 235/375 |
| 2008/0228346 A1 * | 9/2008 | Lucas | G06Q 10/087 701/31.4 |
| 2008/0231446 A1 * | 9/2008 | Cresto | G06Q 10/08 340/572.1 |
| 2009/0089069 A1 * | 4/2009 | McKibbon | G06Q 10/00 705/317 |
| 2009/0112394 A1 * | 4/2009 | Lepejian | G07C 5/0808 701/29.5 |
| 2009/0177336 A1 * | 7/2009 | McClellan | B60R 25/2018 701/2 |
| 2009/0195370 A1 * | 8/2009 | Huffman | B60R 25/04 340/426.13 |
| 2009/0296146 A1 * | 12/2009 | Nakawaki | H04N 1/00222 358/1.15 |
| 2009/0309709 A1 * | 12/2009 | Bevacqua | B60R 25/102 340/426.18 |
| 2010/0076801 A1 * | 3/2010 | Ku | G06Q 20/382 705/64 |
| 2010/0094482 A1 * | 4/2010 | Schofield | G08G 1/205 701/2 |
| 2011/0119614 A1 | 5/2011 | Powell et al. | |
| 2011/0166897 A1 * | 7/2011 | Beckman | G06Q 10/02 705/5 |
| 2012/0039212 A1 * | 2/2012 | Kaliyaperumal | H04W 88/16 370/254 |
| 2012/0079272 A1 * | 3/2012 | Tolle | G06F 3/04847 713/168 |
| 2012/0142367 A1 | 6/2012 | Przybylski | |
| 2012/0252407 A1 * | 10/2012 | Poltorak | H04M 15/00 455/410 |
| 2013/0006916 A1 * | 1/2013 | McBride | G06Q 30/0601 706/52 |
| 2013/0227650 A1 * | 8/2013 | Miyake | H04L 63/08 726/3 |
| 2013/0254469 A1 * | 9/2013 | Miyake | G06F 8/654 711/103 |
| 2013/0297456 A1 * | 11/2013 | Annan | G06Q 30/06 705/26.81 |
| 2013/0301829 A1 * | 11/2013 | Kawamura | H04L 9/0816 380/44 |
| 2013/0305323 A1 * | 11/2013 | Kleve | H04L 9/3215 726/4 |
| 2014/0039935 A1 * | 2/2014 | Rivera | G06Q 40/08 705/4 |
| 2014/0114502 A1 * | 4/2014 | Hugron | B60W 50/14 701/2 |
| 2014/0159866 A1 * | 6/2014 | Hwang | G08C 17/02 340/5.64 |
| 2014/0200737 A1 * | 7/2014 | Lortz | B60R 25/25 701/1 |
| 2014/0344014 A1 * | 11/2014 | MacInnis | G06Q 30/0201 705/7.29 |
| 2014/0365160 A1 | 12/2014 | Steffen, II | |
| 2014/0372245 A1 | 12/2014 | Woodcock | |
| 2015/0045983 A1 * | 2/2015 | Fraser | G07C 5/008 701/1 |
| 2015/0100506 A1 * | 4/2015 | Binion | G06O 30/0278 705/306 |
| 2015/0154607 A1 * | 6/2015 | Frome | G06Q 30/018 705/317 |
| 2015/0260529 A1 | 9/2015 | Petersen | |
| 2015/0286994 A1 | 10/2015 | Elder | |
| 2016/0127373 A1 | 5/2016 | Avary et al. | |
| 2016/0127384 A1 * | 5/2016 | VoBa | G06F 21/53 726/7 |

OTHER PUBLICATIONS

PCT International Search Report and Written Opinion of the International Searching Authority, dated Mar. 2, 2016, application No. PCT/US2015/58347.

PCT International Search Report and Written Opinion of the International Searching Authority, dated Feb. 12, 2016, application No. PCT/US2015/58395.

\* cited by examiner

AUTOMATIC CONNECTED VEHICLE DEMONSTRATION PROCESS

CROSS-REFERENCE TO RELATED APPLICATIONS

This application is a continuation-in-part of U.S. patent application Ser. No. 14/927,258, filed on Oct. 29, 2015, entitled "AUTOMATIC CONNECTED VEHICLE DEMONSTRATION PROCESS" which claims benefit under 35 USC 119(e) of U.S. Provisional Patent Application No. 62/073,667, filed on Oct. 31, 2014, entitled "AUTOMATIC ENROLLMENT AND METHODS OF USE," and is related to U.S. patent application Ser. No. 14/927,221, filed on Oct. 29, 2015, entitled "AUTOMATIC CONNECTED VEHICLE ENROLLMENT," and U.S. patent application Ser. No. 14/927,285, filed on Oct. 29, 2015, entitled "AUTOMATIC CONNECTED VEHICLE SUBSEQUENT OWNER ENROLLMENT PROCESS." all of which are incorporated herein by reference in their entireties.

FIELD OF THE INVENTION

The present invention is directed toward automotive communication services and more particularly to a method and system for providing demonstration of connected vehicle services via a demonstration vehicle.

BACKGROUND

In the transportation industry, various vehicle services are often offered to users of vehicles to enhance their experience with the vehicle. Familiar services now include a variety of software and application-based services, in varied forms, some of which are for free and other which require a subscription or fee-based model. Example of such services include enabling users to connect their smart phones to the vehicles audio system, providing turn-by-turn directions through in-car, on-screen applications, and receiving emergencies services such as unlocking a vehicle's door or the automated reporting of an accident. Many of these services are consumer-focused, in which they enhance the experience of using a vehicle and for some consumers, the availability of these services can be persuasive in making a buying decision for a particular car brand or model.

However, prior to or during a purchase, a salesperson's ability to successfully access the varied services available for a possible customer for a particular vehicle may influence a customer's buying decision. Further, there may be occasions at a dealership, for instance, where a demonstrator vehicle (demo) is not available to show possible customers as it is being used, may have been sold, or is otherwise indisposed. To overcome this issue, a dealership may seek to add more demo units to its inventory, which can be costly, or limit the utilization of the demo units so as they may not be sold or leave the dealership for extended periods of time; however, each of these approaches creates additional burdens to the dealership including additional costs, logistical challenges and security issues in which verification processes can be complicated.

Therefore there is a desire to better activate subscription services on various vehicles at a point of sale (POS) location, via an authentication-based process, while overcoming the traditional security, financial and logistical challenges. In this manner, the ability to perform improved dealer demonstrations of vehicles having subscription services may be realized. The present invention is directed to such a need.

SUMMARY

In one or more embodiments, a computer implemented method is disclosed for registering a demonstration vehicle via a secure vehicle registration network. In one or more embodiments, the method provides for a computer implemented method for registering a demonstration vehicle via a secure vehicle registration network. The method includes providing an interactive interface for registering the vehicle. Further the methods include receiving predetermined dealer information of a dealer and vehicle information of a vehicle requested to be registered as a demonstration vehicle, from a registered user, and transmitting the received predetermined dealer information and vehicle information to an authentication engine. Additionally, the method includes verifying registration qualification of the vehicle by the registered user via the authentication engine, and activating the registration of the vehicle as a demonstration vehicle if the registration qualification is successful.

A further embodiment of the present invention provides for a system for use in an automotive sales network for registering one or more demonstration vehicles to a dealership via a secure vehicle registration network. The system includes an interactive interface engine providing an interactive interface for registering one or more vehicles as a demonstration vehicle, which is capable of receiving and transmitting messages. The system also includes an authentication engine for receiving dealer information and vehicle information from one or more authorized databases and comparing predetermined dealer information and predetermined vehicle information obtained from one or more received messages with the one or more authorized databases. Additionally, a registration engine for registering the one or more vehicles as a registered demonstration vehicle is provided by the system. Further, the system also provides for a computer-based secure communication system capable of communications with the one or more authorized databases, the vehicle and dealer, and a reporting engine for generating one or more reports in response to data from one or more of the authentication engine and the registration engine.

The present invention also provides for a computer program product containing a computer readable medium for use in an automotive sales network for registering, deregistering and managing a dealer's vehicles as demonstration vehicles. The program instructions of the computer program product include providing an interactive interface for registering, deregistering and managing vehicles of a dealer as demonstration vehicles. The program instructions also provide for receiving predetermined dealer information of a dealer and vehicle information of one or more vehicles requested to be registered, registered, deregistered or managed as a demonstration vehicle, from a registered user, and transmitting the received predetermined dealer information and vehicle information to an authentication engine. The program instructions further provide for verifying registration, de-registration and management qualification of the vehicle by the registered user via the authentication engine, and activating, deactivating or otherwise amending registration of the one or more vehicles as a demonstration vehicle if the registration qualification is successful.

DETAILED DESCRIPTION

The present invention is directed toward an automatic connected vehicle demonstration method and system for automatically designating any registered vehicle as a demonstrator vehicle, and further allowing for the demonstrator vehicle to also have one or more subscription-based events based on demonstrator vehicle status.

The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

It is recognized that automotive dealerships have opportunity for improvement in the sales and demonstration cycles concerning connected vehicle services (also known as subscription services). In part, dealerships may not have enough demonstration vehicles having subscription services available for use by sales people; dealerships may sell a demonstration vehicle and thereby reduce the available demonstration capability to prospective customers; electing which vehicles should become demonstration vehicles and which should not become problematic when considering whether a demonstrator would remain available for subscription service demonstrations as well; financial challenges arise as a dealership is often separately charged for a demonstrator vehicle; and logistical issues arise as dealerships are often limited to fixed number of demonstrators for a period of time. The present invention overcomes these undesired outcomes.

The embodiments presented here utilize machine learning and automation so that the process and system can be used for large scale application. The vehicle owner identification may begin with the dealer responsible for selling the vehicle, where the vehicle is registered or enrolled as belonging to that dealer and to defined geo location boundaries for all locations belonging to that particular dealer. The geo location boundaries or parameters may include sales floor, servicing bays, fueling stations, washing stations, etc.

Once registered, the behavior of the registered vehicles may be monitored based on the geolocation parameters provided to the system. If a vehicle begins reporting that it is regularly outside the dealership "norms" or the defined geolocation parameters, the system checks for an account set up with change in account information. If none exists, the system automatically messages the vehicle to enroll as a sold/leased vehicle where the vehicle is transferred from one owner to another. The process of monitoring and alerting the vehicle is an automated process based on machine learning and depends on what the system "learns" from the vehicle's usage with respect to the defined geolocation parameters.

Currently, original equipment manufacturers (OEM), e.g. automakers, may have a difficult time knowing who is actually selling their vehicles because of the prevalence of vehicle swapping. A database of all dealerships, servicing points, and ancillary points (fueling, washing, body shops, etc.) is maintained based on machine learning. When a service request comes into the automaker's or third party system providing services like a remote door unlock, if there is no active account associated with the vehicle nor record of being sold via a retail delivery report (RDR) or other means, and the vehicle is on a known dealer site, the service request may be granted. All of this is done via machine learning, pattern recognition, and automation requiring minimal or no human interaction.

Figure 1:
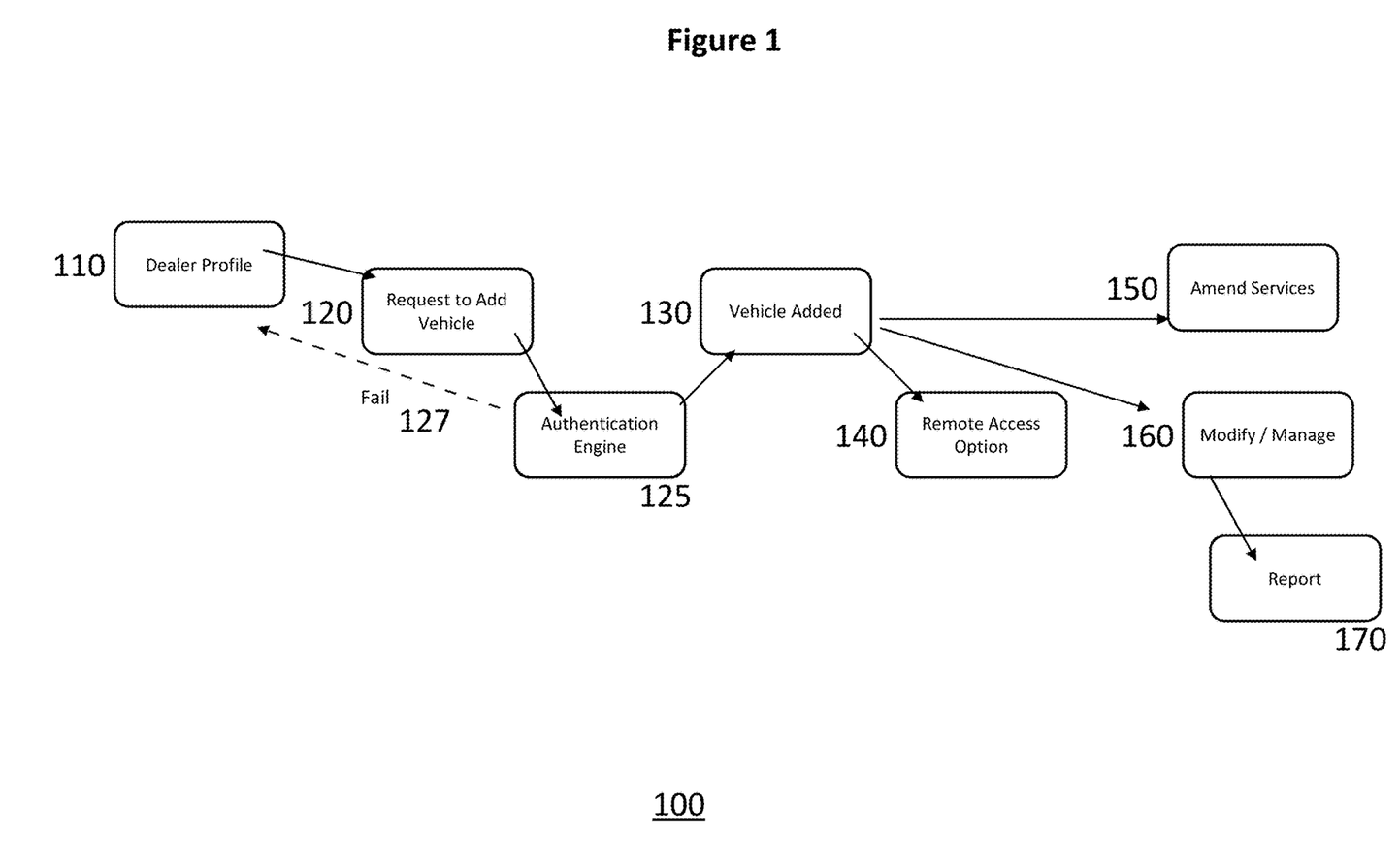
FIG. 1 illustrates a block diagram 100 of the connected vehicle demonstration method in accordance with one or more embodiments of the present invention.

FIG. 1 illustrates a block diagram 100 of the connected vehicle demonstration method in accordance with one or more embodiments of the present invention. From FIG. 1, an authorized dealer accesses their secure profile at 110 and requests to add a demonstrator vehicle to their registered inventory of vehicles at 120. The request would include at least identifying the dealership by a store identification code and the vehicle by a vehicle identification number (VIN). The request, in one or more embodiments of the present invention, may be performed via a computer terminal, via the web, via an application on a wireless device, or other via another mobile, electronic or device capable of electronic communication with an interactive interface. The dealer's request is then authenticated by an authentication engine at 125. The authentication engine compares at least the dealer identification with the vehicle VIN to ensure that the dealer is in possession of the vehicle identified by the VIN. In an embodiment, the present invention provides that the authentication engine assesses other information about the vehicle with at least one or more databases having known and secured vehicle information.

For instance, at 125, the authentication engine compares the location of the identified vehicle with an authorized geolocation database, compares the ownership records of the vehicle with an authorized vehicle ownership database, and further compares the dealership records regarding the vehicle with an authorized ownership credential database to ensure that the dealership has proper and authenticated possession of the requested vehicle. Once the authentication completes its assessment of the relevant received data from the dealership regarding the dealership and the requested vehicle, assuming that the data is accurate and consistent, the authentication engine then adds the requested vehicle to the dealership inventory as a demonstrator vehicle, at 130. In the event the assessment failed, a message is returned to the dealer to indicate such at 127.

Once the vehicle is added to the dealer inventory as a demonstrator vehicle, the dealer is able to then access certain services and activities regarding the vehicle in a remote manner at 140. The remote access may be via the web, by smart phone application, shared messaging service (SMS), or other electronic means which provides for enabling access and communications with the secure communication system connecting the vehicle communication system with the authorized server of the system of the present invention.

Similarly, at 150, the dealer is able to further amend the services on the demonstrator vehicle. Service amendments may include amending subscription services, actively requesting maintenance or performance information, and associating the vehicle with a particular parking location via geopositional and geolocational techniques, for instance. It will be appreciated by those skilled in the art that there are many variations of service amendment for which the present invention is capable of engagement.

At 160, the dealer is also able to further modify and manage demonstrator inventory and activity. The dealer may, in accordance with one or more embodiments, deactivate a demonstrator for a particular day where maintenance is scheduled, make a demonstrator unavailable for general use where it is assigned to a particular customer, and replace one demonstrator with another vehicle as a new demonstrator, for example.

At 170, the dealer may generate a report of the activities of any individual demonstrator, the fleet of demonstrators, or activities and services associated with any or all of the demonstrators related to the dealership, for example.

In one or more embodiments of the present invention, customer information may be used in conjunction with the demonstrator registry to effect an improved personalized approach in creating an enhanced environment for selling to a customer. For example, a customer's name, email and phone number may be associated with the subscription services of the demonstrator for a particular test drive in which the customer already appreciates how the vehicle appears tailored for the individual customer's use, thereby possibly enhancing the purchasing experience and likelihood of the customer purchasing a vehicle based on the test drive. Similarly, a dealer's information may be used in conjunction with the demonstrator registry to effect a demonstrator which reminds a user of the demonstrator of additional services at the dealership, the reputation of the dealership and the satisfaction other customers have had at the dealership, for example.

Additionally, vehicle information may also be similarly utilized in the present invention to associate the customer, the dealer and demonstrator in an improved sales environment where there is an increased opportunity for creating a sale of a vehicle using the present invention.

For instance without limitation, dealer information may include name, address, email, cell phone number, social security information, security code, self-identifying key numbers, user name, user password, mobile device information, and other information pertinent to the dealer in relation to the sales transaction. Dealer information may also include, without limitation, one or more of dealer identification information, dealer purchasing history, dealer ownership information, dealer geolocation information, dealer subscription information, dealer account data, dealer contact information, dealer marketing information, publicly available information about the dealer and private sourced information about the dealer, etc.

For instance without limitation, customer information may include name, address, email, cell phone number, social security information, security code, self-identifying key numbers, user name, user password, mobile device information, and other information pertinent to the customer in relation to the sales transaction. Customer information may also include, without limitation, one or more of customer identification information, customer purchasing history, customer ownership information, customer geolocation information, customer subscription information, customer account data, customer contact information, customer marketing information, publicly available information about the customer and private sourced information about the customer, etc.

By example, for instance without limitation, vehicle information may include vehicle identification number (VIN), brand and model, OEM proprietary data related to the vehicle, title information, dealership codes, delivery codes, security information, key codes, and other information pertinent to the vehicle in relation to the sales transaction, etc.

Additionally, customer and/or vehicle information may include information inclusive of that which is available in retail delivery reports and databases (RDRs), registered vehicles data, registered vehicle owners data, registered vehicle credentials data, registered vehicle identification data, registered vehicle security data, vehicle identification number (VIN) data and history, geolocation and history, depositional information and history, title information and history, insurance information and history, ownership information and history, past history information, subscription information, vehicle geolocation information, publicly available information, and private sourced information, etc. Further customer and/or vehicle information may include marketing information including web history associated with vehicle manufacturer, prior contacts with vehicle manufacturer and distributor, incentive and rebate utilization, third party information (e.g., Nielsen, IHS and Polk databases) responses to targeted marketing regarding vehicle, email address(es), and registered applications utilized by customer, etc.

Figure 2A:
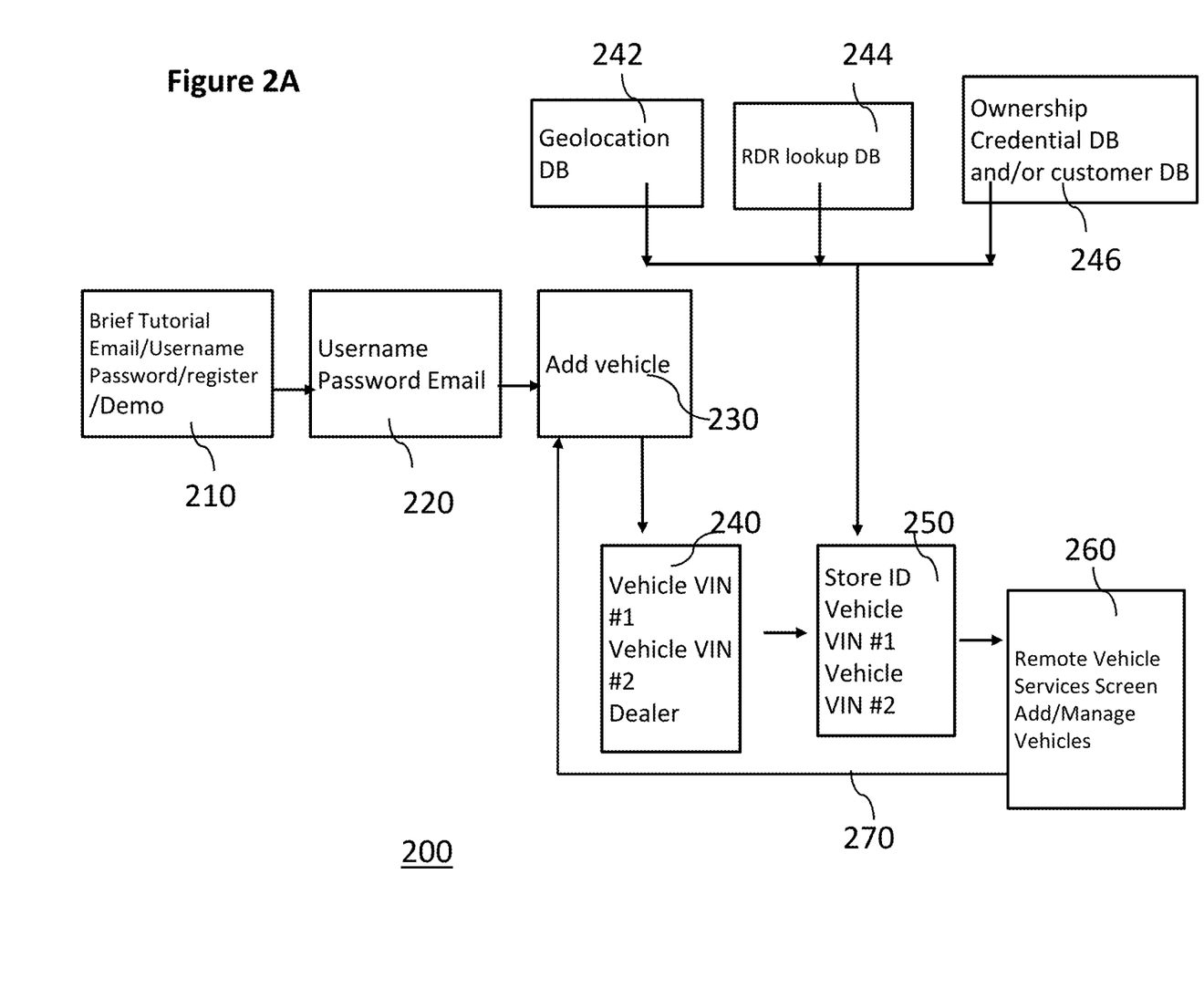
FIG. 2A illustrates a block diagram 200 of the connected vehicle demonstration method in accordance with one or more embodiments of the present invention.

FIG. 2A illustrates a block diagram 200 of the connected vehicle demonstration method in accordance with one or more embodiments of the present invention. From FIG. 2A, a tutorial, secured entry and general demonstration are each available at 210 as an instructional incentive to a user or potential user of the present invention. Formalized and authentic entry to the secure system is also provided where the user may launch the application, or other software-driven approach for the present invention (such as a uniform resource locator, weblink, runtime application, script, etc.), and be requested to input a secure series of self-identifying inputs via an interactive interface. In an embodiment, at 220, the user would input a registered username, an authorized password and an active and registered email address. Once entered, the user would await verification from a server which would compare and authorize continued access in the system where the inputted data matched the data registered via an authentication engine.

At 230, the dealer is now able to access activities in the system and requests to add a vehicle to the dealer's inventory. At 240, the dealer identifies the specific vehicle of which is to be added to the inventory by at least vehicle VIN number though other vehicle information may also be requested and identified as needed for the present invention. Once the request is input by the dealer, the authorization server compares the requested vehicle information (requested for demonstrator assignment) with one or more databases having known data and characteristics at 242, 244, and 246. For instance, in one or more embodiments, the remote server acts as an authentication engine to compare: 1) requested data against geolocation data in an authorized geolocation database at 242; 2) requested data against RDR lookup data in an RDA lookup database at 244; 3) and whether the vehicle has been previously sold or otherwise committed by assessing the requested data against an ownership credential database and/or a customer database having one or more customer characteristics identified with purchased vehicles at 246. Preferably, in one or more embodiments, the present invention also assesses the basics information of the store identification and the vehicle VIN number in combination with the additional dealership, vehicle, customer and/or marketing information requested.

At 250, once the verification of a successful comparison is achieved, the demonstrator registration is also achieved and specific data may be past to the vehicle to be registered by a registration event at 260. At 260, the vehicle is categorized as a demonstrator and a remote vehicle services screen is available to the dealer to further manage the demonstrator inventory, which may include adding further vehicles, at 270, or removing vehicles.

In accordance with one or more embodiments of the present invention, vehicle, dealer, marketing and/or customer data may be provided to the vehicle's communication system. The vehicle communication system may include cellular and/or wifi enabling communication protocols to enable receipt and transmission of messages to and from an authorized server, local link, and/or remote communication system, such as the authentication engine. In one or more embodiments, once authentication is granted, the dealer may activate subscription services and access to the vehicle for use as a demonstrator including generating a 'welcome' message for the visual display within the vehicle.

Figure 2B:
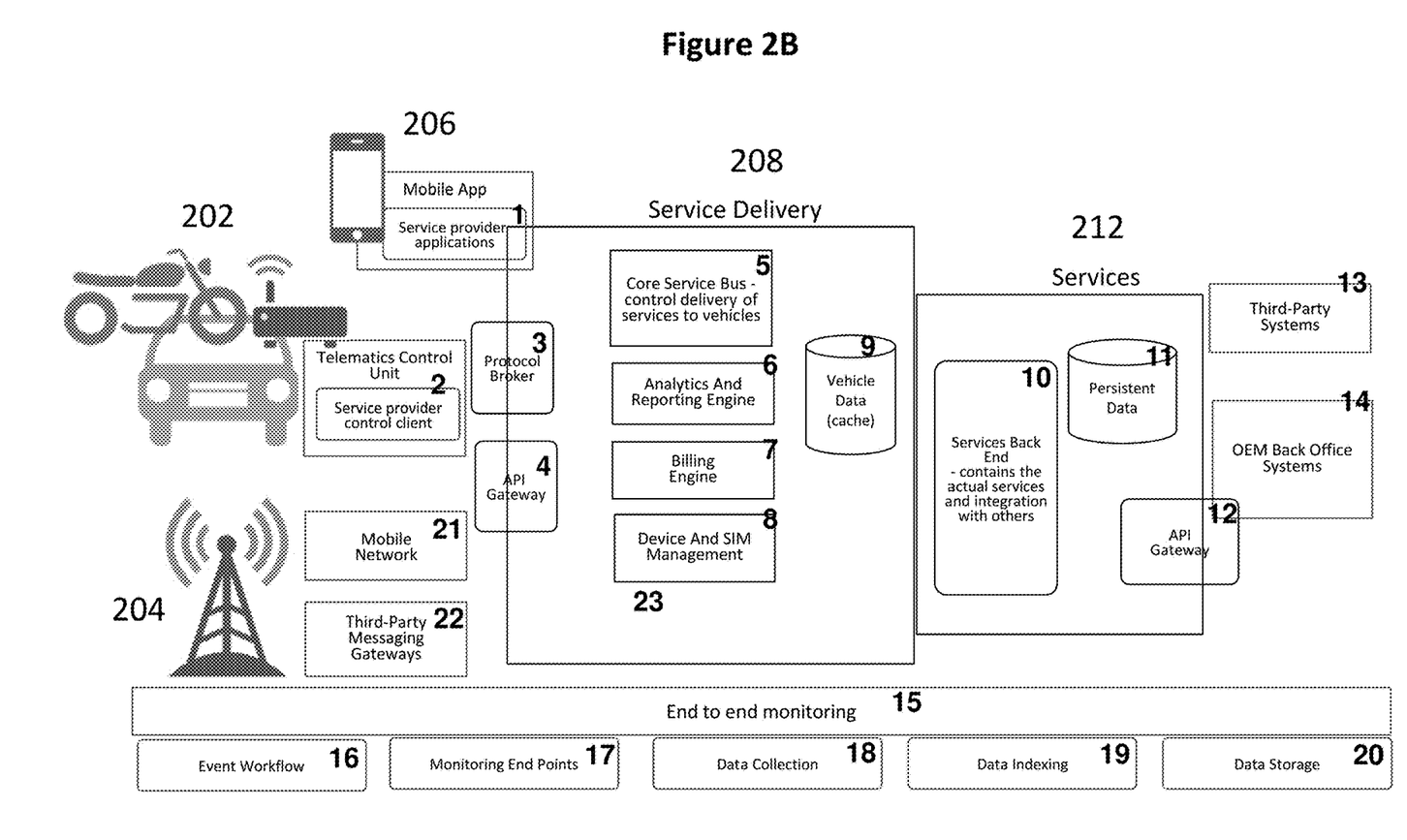
FIG. 2B illustrates a block diagram 200' of a system used in the connected vehicle demonstration method in accordance with one or more embodiments of the present invention.

FIG. 2B illustrates a block diagram 200' of a system used in the connected vehicle demonstration method in accordance with one or more embodiments of the present invention. The interactive interface described in the description accompanying FIG. 2A may be a portal provided by original equipment manufacturer (OEM) and may be used to manage vehicle owner accounts. The interactive interface may include any one or more of a mobile application 1 or a telematics control unit 2, also known as a service provider control client, in communication with a service delivery system 208.

The authentication engine described in the description accompanying FIG. 2A may include many components used in conjunction to determine which person(s) have access to what vehicle(s) and which (exact) services. As described in the description accompanying FIG. 2A, a remote server may act as an authentication engine that verifies registration qualification of the registered vehicle by the user, which may a registered user. The vehicle services may be activated and the vehicle may be used as a demonstration vehicle once the registration qualification is successfully verified. The components of authentication engine along with the remote server described above may include any of a mobile application 1 or a telematics control unit 2, also known as a control client, in communication with a service delivery system 208 including a protocol broker 3 and API gateway 4 communicatively coupled to core service bus 5 which in turn is connected to analytics and reporting engine 6, billing engine 7 and vehicle data (cache) 9.

Once the verification of a successful comparison is achieved via authentication engine, the demonstrator registration is complete and specific data may be passed to the vehicle to be registered by a registration event. The specific data that is passed to the vehicle may include data/services available for dealer demonstration. The data/services available for dealer demonstration may be a subset of the services available to the vehicle owner or may include different services as well as dealer only services. The service set availability to the dealer and/or consumer may be automated. The vehicle is categorized as a demonstrator vehicle and a remote vehicle services screen is made available to the dealer to further manage the demonstrator inventory. Managing demonstrator inventory may include adding more vehicles or removing vehicles from the inventory as described in the description accompanying FIG. 2A.

The core service bus 5 controls the delivery of services to vehicles based on authentication and authorization of vehicles by interacting with services 212 which may include services backend 10, persistent data 11, API gateway 12 in communication with OEM back office systems 14 and/or third party systems 13 providing services and a mobile network 21 used for communication. In accordance with one or more embodiments of the present invention, vehicle, dealer, marketing and/or customer data may be provided to the vehicle's communication system. The vehicle communication system may include cellular and/or wifi, satellite and/or other wireless communication, enabling communication protocols to enable receipt and transmission of messages to and from an authorized server, local link, and/or remote communication system, such as the authentication engine. In one or more embodiments, once authentication is granted, the dealer may activate subscription services and access to the vehicle for use as a demonstrator including generating a 'welcome' message for the visual display within the vehicle. The 'welcome' message may be personalized via automated processes.

The computer based secure communication may include a combination of software and vehicle hardware, mobile application, mobile network access and management as well as monitoring, and reporting functions. The computer based secure communication system may provide communication between a telematics control unit 2, also known as a control client, in communication with a service delivery system 208 including a protocol broker 3 and API gateway 4 which are communicatively coupled to device and SIM management 8 and vehicle data 9 cache. The service delivery system 208 in connected to services including persistent data 11, API gateway 12 in communication with OEM back office systems 14 and/or third party systems 13, a mobile network 21 used for communication, third party messaging gateway 22 and connectivity management 23.

In one or more embodiments, reporting from the system of the present invention may include reports of data identifying vehicles sold, subscription services selected and enabled, success and failure rates of activation and registration, timing and time score associated with sales deliveries, etc. The reporting engine may include components that track usage across applications in the vehicle, on the wireless network, on the services delivery platform, and other $3^{rd}$ party systems, such as dealer delivery and maintenance service or dealer management systems (DMS) systems and may include components such as end to end monitoring 15, event workflow 16, monitoring endpoints 17, data collection 18, data indexing 19 and data storage 20 in addition to the components described above.

Figure 3:
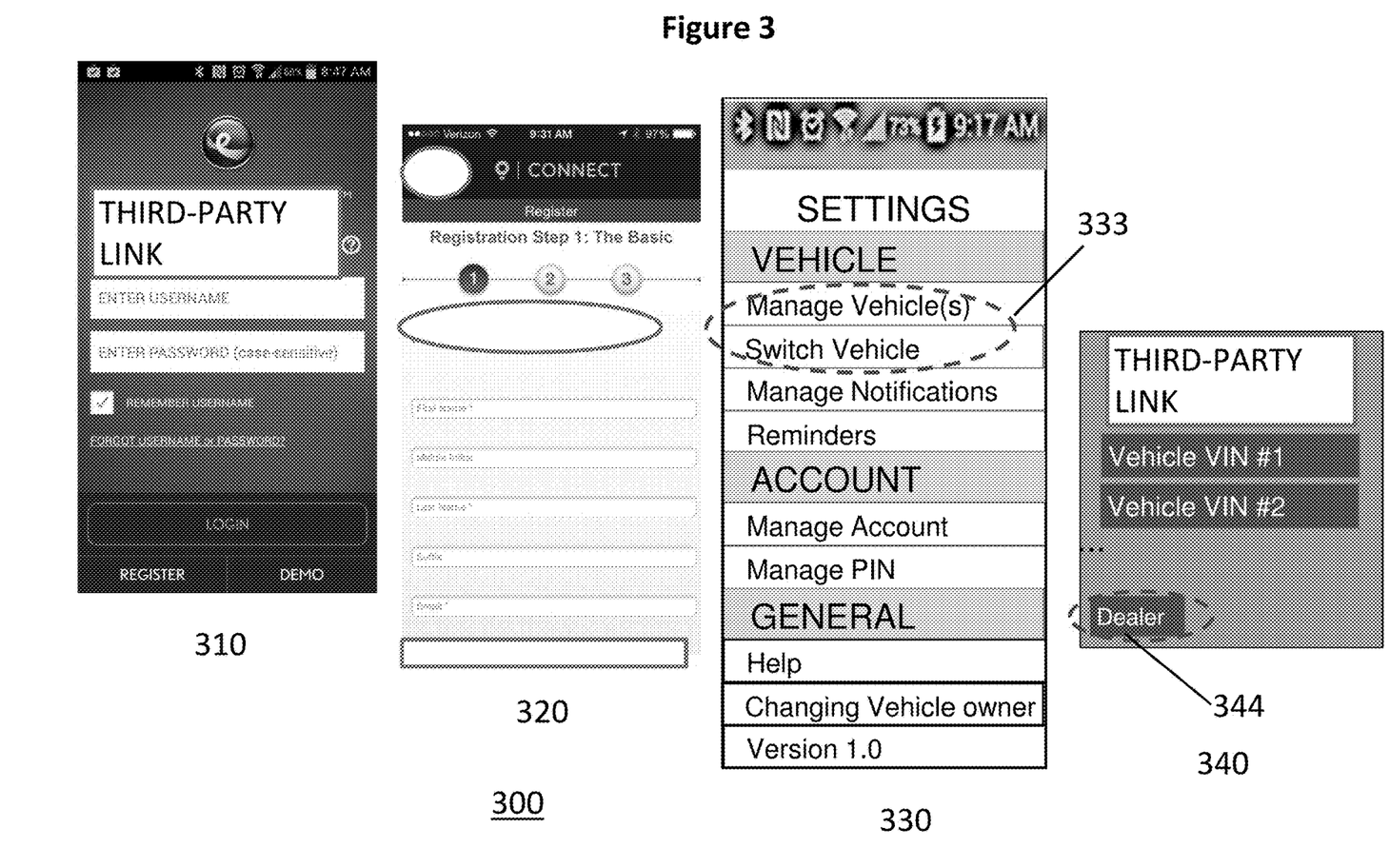
FIG. 3 illustrates a process utilizing a first set of application screens on a smart phone in accordance with one or more embodiments of the invention.

FIG. 3 illustrates a process 300 utilizing a first set of application screens on a smart phone in accordance with one or more embodiments of the invention. From FIG. 3, at 310 a smart phone depiction is used to indicate the presence of an active application in which link services of the present invention may be utilized. At 310, a user may register, login or view a demo. To register, a user enters information requested about the user, as shown by example, at 320, and an authentication engine reviews, assesses and approves the user as a registered user or denies the application. After a user is authenticated and approved for access via registration, the registered user is connected to the link environment and the registered user is able to register, de-register, review, and other manage their inventory of demonstration vehicles as depicted at 330.

In the event the user desires to add a vehicle as highlighted at 333, the registered user selects add vehicle(s) and a further screen appears at 340, in which the registered user may then enter the desired vehicles by VIN, for example, to be requested to be registered. The registered user then identifies as a dealer at 344.

Figure 4:
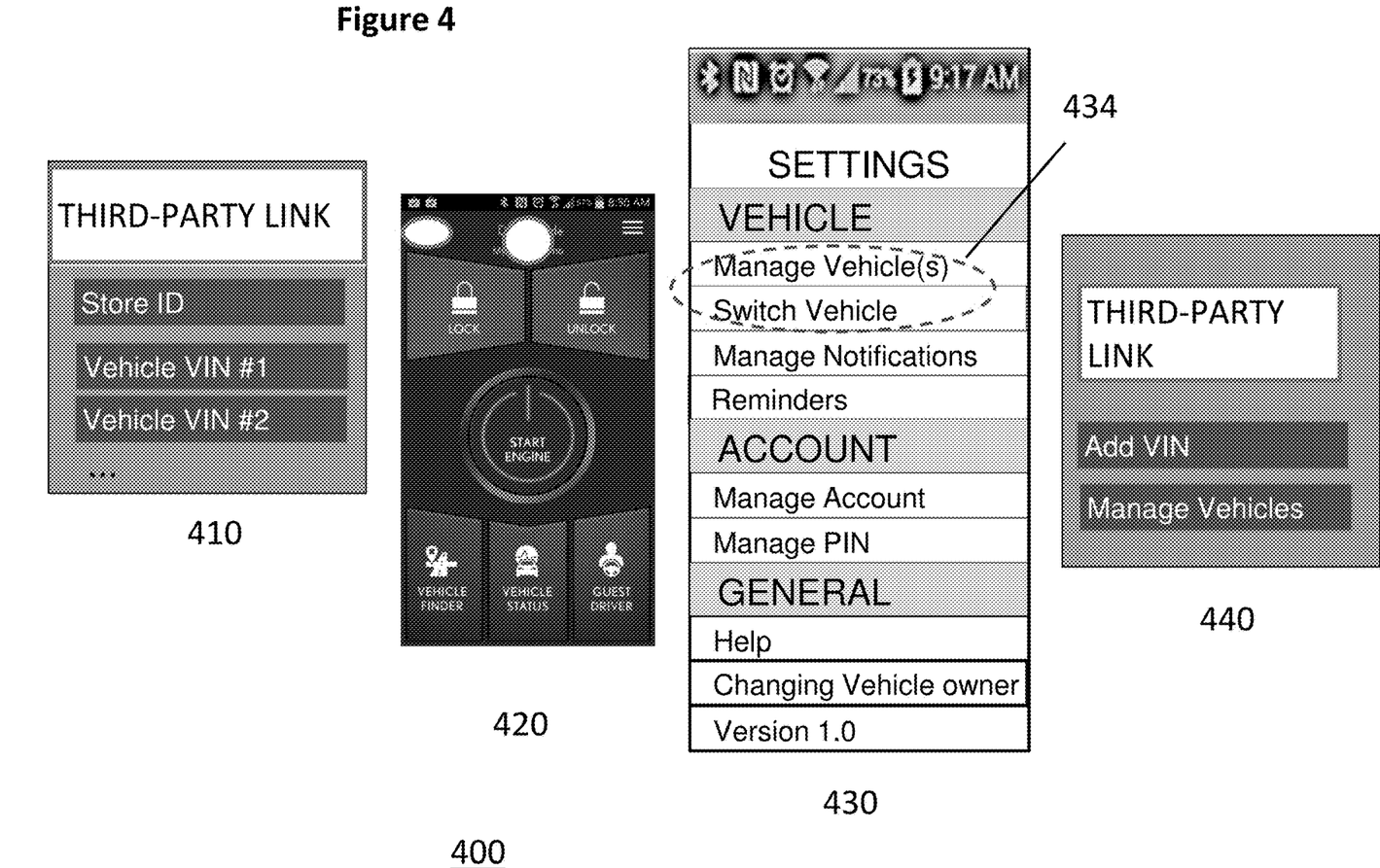
FIG. 4 illustrates a further process utilizing a second set of application screens on a smart phone in accordance with one or more embodiments of the invention.

The routine of FIG. 3 is then continued at FIG. 4. FIG. 4 illustrates a further process utilizing a second set of application screens on a smart phone in accordance with one or more embodiments of the invention. From FIG. 4, the dealer having recently identified as dealer, is then requested to enter dealer information identifying the dealer for review and approval. For example at 410, the dealer may be requested to enter the dealer store identification number as one way to self-identify. The inputted information is the authenticated by the authentication engine and if successful, the dealer is provided access to a remote utilization screen in which one or more of the demonstration vehicles may be controlled by select processes and activities at 420.

For instance, at 420, the dealer may start an engine of a demonstration vehicle or may register a guest driver, for instance. It will be appreciated by those skilled in the art that there are many combination of activities and events for which the present invention may be utilized. Further the dealer may then continue to a further screen in which the dealer is able to manage the demonstration inventory at 430. For instance, where the dealer desires to add, subtract or otherwise manage the demonstration vehicles, the dealer may select the 'manage vehicles' tab at 434 which will advance to screen 440. At 440, specific VINs may be identified and added, removed or otherwise managed for the dealer inventory of demonstration vehicles.

Figure 5:
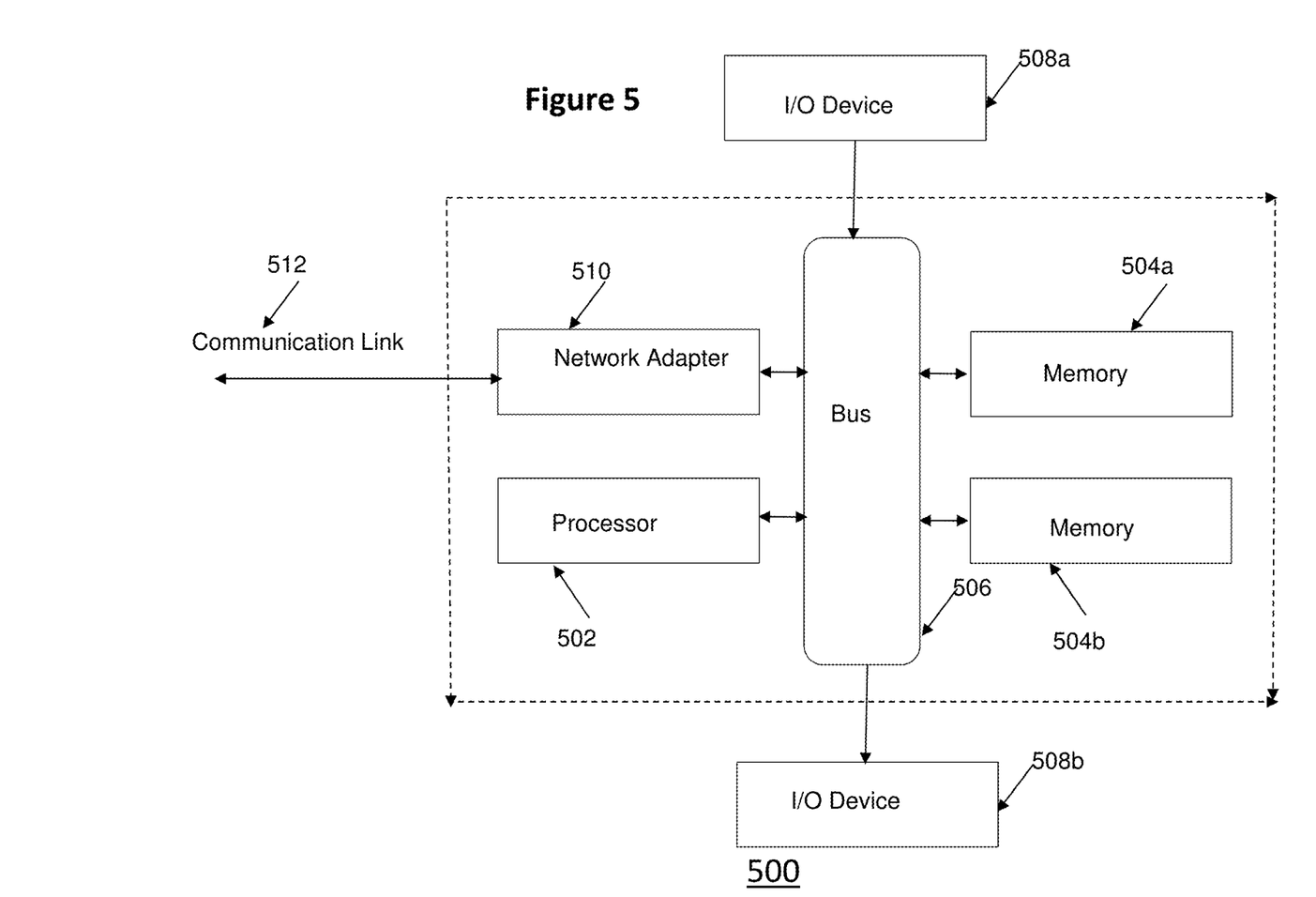
FIG. 5 illustrates a data processing system suitable for storing the computer program product and/or executing program code in accordance with an embodiment of the present invention.

FIG. 5 illustrates a data processing system 500 suitable for storing the computer program product and/or executing program code in accordance with an embodiment of the present invention. The data processing system 500 includes a processor 502 coupled to memory elements 504*a-b* through a system bus 506. In other embodiments, the data processing system 500 may include more than one processor and each processor may be coupled directly or indirectly to one or more memory elements through a system bus.

Memory elements 504*a-b* can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to the data processing system 500. I/O devices 508*a-b* may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Figure 6:
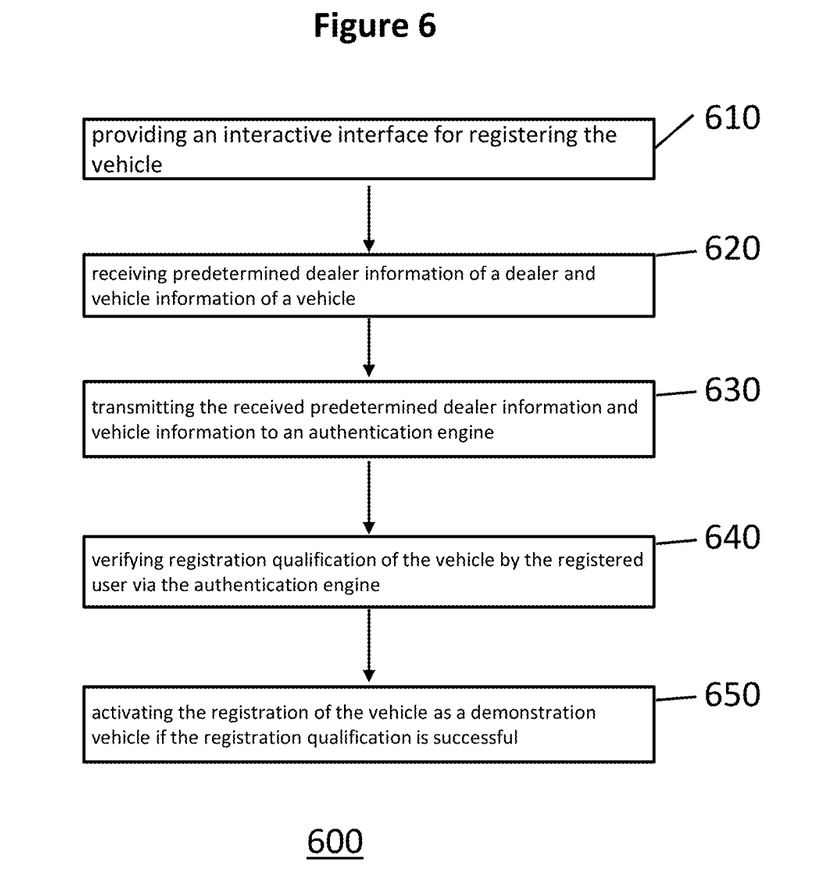
FIG. 6 sets forth a process of an embodiment of the present invention in which one or more vehicles of a dealer are registered as demonstration vehicles.

FIG. 6 sets forth a process 600 of an embodiment of the present invention in which one or more vehicles of a dealer are registered as demonstration vehicles.

From FIG. 6, at 610 the present invention includes providing an interactive interface for registering the vehicle. In an embodiment, the interactive interface includes one or more of an in-vehicle computer touch screen, an application for a smart phone having an input capability, a shared messaging service, a web page, a web-based hyperlink, and an email requiring a response. The interactive interface engine is described in detail in the description accompanying FIGS. 2A and 2B.

At 620, the present invention provides for receiving predetermined dealer information of a dealer and vehicle information of a vehicle requested to be registered as a demonstration vehicle, from a registered user. In an embodiment, wherein the at least one or more predetermined characteristics of the dealer information is a dealer identification code and the one or more predetermined characteristics of the vehicle information is the vehicle identification number (VIN). Additionally, in another embodiment, the associated data in one or more authorized databases having known dealer information and known vehicle information vehicle includes a secure dealer information database having an active list of approved dealer identification codes and includes a secure vehicle information database having an active list of available vehicles identifiable by VIN for approval or rejection for registry as a demonstration vehicle.

At 630, the present invention provide for transmitting the received predetermined dealer information and vehicle information to an authentication engine. In an embodiment, the authentication engine is a remote server configured for secure communication with the vehicle to be registered and the registered user. The authentication engine is described in detail in the description accompanying FIGS. 2A and 2B.

At 640, the present invention provides for verifying registration qualification of the vehicle by the registered user via the authentication engine. In an embodiment, the verifying registration qualification of the vehicle to be registered includes comparing at least one or more predetermined characteristics of the dealer information and one or more predetermined characteristics of the vehicle information with associated data in one or more authorized databases having known dealer information and known vehicle information vehicle.

At 650, the present invention provides for activating the registration of the vehicle as a demonstration vehicle if the registration qualification is successful. Once activated, the present invention further provides for optionally registering a predetermined level of subscription services with the vehicle to be registered after activation of the registration of the vehicle as a demonstration vehicle, and managing a dealer's demonstration vehicle inventory by one or more of adding, subtracting or temporarily suspending predetermined vehicles of the dealer through the interactive interface.

Figure 7:
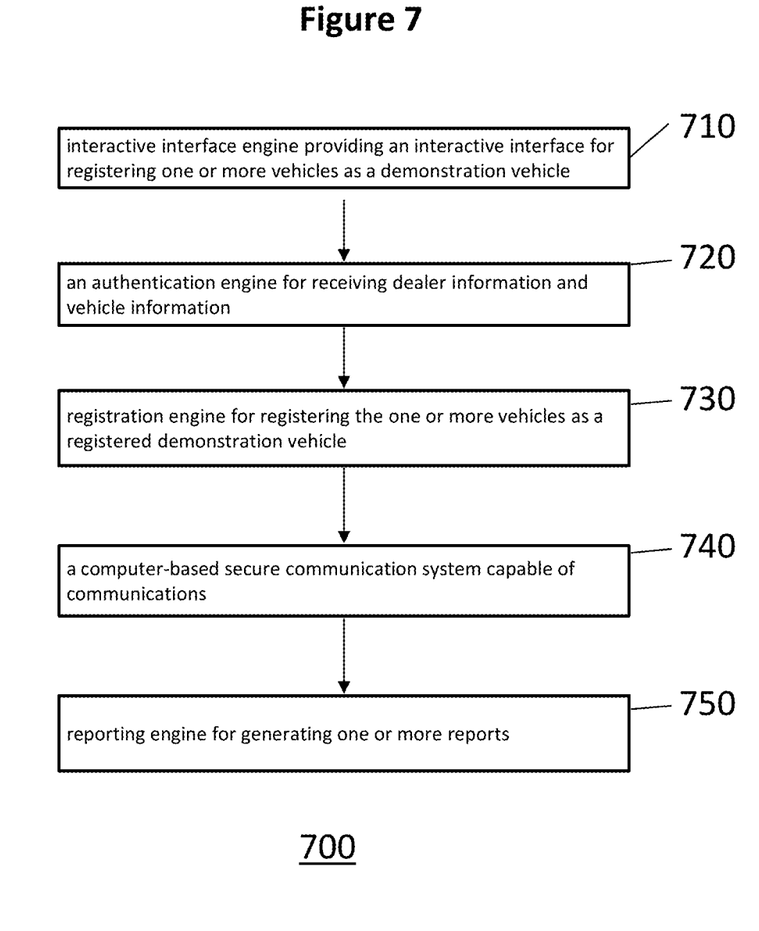
FIG. 7 sets forth a further process 700 of an embodiment of the present invention including a system for use in an automotive sales network for registering one or more demonstration vehicles to a dealership via a secure vehicle registration network.

FIG. 7 sets forth a further process 700 of an embodiment of the present invention including a system for use in an automotive sales network for registering one or more demonstration vehicles to a dealership via a secure vehicle registration network.

At 710, the present invention provides for an interactive interface engine providing an interactive interface for registering one or more vehicles as a demonstration vehicle, which is capable of receiving and transmitting messages. In an embodiment, the interactive interface engine includes one or more of an in-vehicle computer touch screen, an application for a smart phone having an input capability, a shared messaging service, a web page, a web-based hyperlink, and an email requiring a response. The interactive interface engine, also known as interactive interface is described in detail in the description accompanying FIGS. 2A and 2B.

At 720, the present invention further provides for an authentication engine for receiving dealer information and vehicle information from one or more authorized databases and comparing predetermined dealer information and predetermined vehicle information obtained from one or more received messages with the one or more authorized databases. The authentication engine is described in detail in the description accompanying FIGS. 2A and 2B.

In a further embodiment, the activation engine may activate one or more subscription-based events in association with a level of service to be activated for the vehicle when registered as a demonstration vehicle. Additionally, the activation engine may also act as a deactivation engine for deactivating a registered demonstration vehicle to be removed from the list of dealer demonstration inventory. In a further embodiment, the activation engine is for activating a plurality of subscription-based events in association with a level of service to be activated for the vehicle when registered as a demonstration vehicle, wherein the subscription-based events include one or more of a for-fee application, for-free application, music service, emergency service, safety and notification service, diagnostic service, reporting service, maintenance service, in-car application, mobile application, and remote application.

At 730, the present invention further provides for a registration engine for registering the one or more vehicles as a registered demonstration vehicle.

At 740, the present invention further provides for a computer-based secure communication system capable of communications with the one or more authorized databases, the vehicle and dealer. The computer based secure communication is described in detail in the description accompanying FIGS. 2A and 2B.

At 750, the present invention further provides for a reporting engine for generating one or more reports in response to data from one or more of the authentication engine and the registration engine. The reporting engine is described in detail in the description accompanying FIGS. 2A and 2B.

Preferably, in one or more embodiments, reporting from the system of the present invention will include reports of data identifying vehicles sold, subscription services selected and enabled, success and failure rates of activation and registration, timing and time score associated with sales deliveries, etc.

As used herein the term subscription-based services may include any vehicle service or customer service such as those associated with telematics, safety and security, remote services, navigation, performance, geolocation and geopositional, diagnostics, convenience applications, general information, utilization of publicly accessible data and electronic databases, etc. The term subscription-based is not intended to imply a for-fee service is required, rather the term is specific to indicate that customer must subscribe to the particular service through an activation or registration event associated with the vehicle; once the customer subscribes to the service, the service is then available to the customer through the vehicle.

Other exemplary services which are intended to be part of the present invention as being subscription services available include but are not limited to: (1) Safety and Security services including ACNDirect, SOS, Vehicle Finder; (2) Remote Services including door lock/unlock, engine start, horn honk, flash lights, trunk open, cabin pre-conditioning, geofencing and speed alerts, window control; (3) Performance Services including: performance report, vehicle snapshot, remote vehicle information; OTA updates and upgrades; (4) Navigation Services including: maps, map updates, real-time traffic, speed cam warnings, POI search, parking spots; (5) Infotainment Services including: cloud-based applications, streaming music, streaming video, internet browsing, news, stocks, sport scores, concierge, movie listings, flight info, calendar, weather forecast.

While the present invention has set forth sequences and/or steps involved in one or more embodiments of the present invention, the present invention is not so limited as to require the sequences set forth to be required to perform the present invention; the present invention may be adapted and enabled using the sequences and/or steps in varied configurations and order, whereas the present invention will remain operational as intended and perform successfully.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications and network includes communications across a network using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Accordingly, a system and method in accordance with one or more embodiments presented above overcomes the challenges of existing practices and provides a more robust and convenient approach to better enroll customers with their vehicle via an authentication-based process while overcoming the traditional security, financial and logistical challenges.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk, Current examples of optical disks include DVD, compact disk-read-only memory (CD-ROM), and compact disk read/write (CD-R/W).

What is claimed is:

1. A computer-implemented method for registering and enabling services of a demonstration vehicle via a secure vehicle registration network, the method comprising:
   providing an interactive interface for registering a vehicle;
   receiving via the interactive interface predetermined dealer information of a dealer and vehicle information of the vehicle requested to be registered as a demonstration vehicle, from a registered user;
   transmitting the received predetermined dealer information and vehicle information to an authentication engine;
   comparing location of the vehicle with an authorized geolocation database;
   receiving verification of registration qualification of the vehicle by the registered user from the authentication engine;
   registering the vehicle as a demonstration vehicle;
   receiving customer information and dealer information;
   activating one or more subscription-based events associated with the customer information in conjunction with a demonstrator registry for the vehicle when registered as the demonstration vehicle;
   providing information related to the dealer associated with the dealer information in conjunction with the demonstrator registry for the vehicle when registered as the demonstration vehicle; and
   in response to the registering the demonstration vehicle, activating performance services of the demonstration vehicle, wherein the performance services include at least one of: performance report, vehicle snapshot, remote vehicle information, or Over-the-Air (OTA) updates and upgrades.

2. The computer-implemented method of claim 1, wherein the verification of registration qualification of the vehicle to be registered includes positive comparison of at least one or more predetermined characteristics of the dealer information and one or more predetermined characteristics of the vehicle information with associated data in one or more authorized databases having known dealer information and known vehicle information.

3. The computer-implemented method of claim 2, wherein the at least one or more predetermined characteristics of the dealer information is a dealer identification code and the one or more predetermined characteristics of the vehicle information is vehicle identification number (VIN).

4. The computer-implemented method of claim 3, wherein the associated data in one or more authorized databases having known dealer information and known vehicle information includes a secure dealer information database having an active list of approved dealer identification codes and includes a secure vehicle information database having an active list of available vehicles identifiable by VIN for approval or rejection for registry as a demonstration vehicle.

5. The computer-implemented method of claim 3 further comprising generating a report of data associated with the demonstration vehicle registrations for a dealership including at least one of a report of detailed dealer usage of demonstration vehicles, listing of demonstration vehicles used by the dealership over a predetermined period of time, and listing of sales time to sell demonstration vehicles of the dealership over a predetermined period of time.

6. The computer-implemented method of claim 5, wherein the interactive interface includes at least one of: a user interface for an in-vehicle computer, a user interface for a smart phone, a shared messaging service, a web page, a web-based hyperlink, and an email requiring a response.

7. The computer-implemented method of claim 6, wherein the secure vehicle registration network includes one or more networked resources having at least one data source with vehicle information, dealer information, marketing information, and customer information, accessible by the authentication engine.

8. The computer-implemented method of claim 7, wherein the authentication engine is a remote server configured to provide secure communication with the vehicle to be registered and the registered user.

9. The computer-implemented method of claim 8 further including managing a dealer's demonstration vehicle inventory by one or more of adding, subtracting or temporarily suspending predetermined vehicles of the dealer through the interactive interface.

10. The computer-implemented method of claim 8, wherein the registered user is an authorized representative of the dealer.

11. The computer-implemented method of claim 1, further comprising activating the OTA updates and upgrades, wherein the demonstration vehicle receives the OTA updates and upgrades and implements the received OTA updates and upgrades.

12. The computer-implemented method of claim 1, further comprising:
   in response to the registering the demonstration vehicle, activating remote services of the demonstration vehicle; and
   instructing the demonstration vehicle to implement the at least one remote services,
   wherein the remote services include at least one of: door lock/unlock, engine start, horn honk, flash lights, trunk open, cabin pre-conditioning, geofencing and speed alerts, window control, and
   wherein the demonstration vehicle performs the at least one remote services.

13. A system for use in an automotive sales network for registering one or more demonstration vehicles to a dealership via a secure vehicle registration network, comprising:
   an interactive interface engine, wherein the interactive interface engine provides an interactive interface for user to register one or more vehicles as a demonstration vehicle,
      wherein the interactive interface engine is capable of receiving and transmitting messages, and wherein the interactive interface engine receives customer information and dealer information;
an authentication engine, wherein the authentication engine is configured to:
  receive a predetermined dealer information and vehicle information from the interactive interface engine and one or more authorized databases,
  compare location of the vehicle with an authorized geolocation database, and
  verify the predetermined dealer information and the vehicle information obtained from the interactive interface engine with the one or more authorized databases;
a registration engine, wherein the registration engine registers the one or more vehicles as a registered demonstration vehicle, a computer-based secure communication system capable of communications with the one or more authorized databases, the vehicle and dealer; and
an activation engine for activating one or more subscription-based events associated with the customer information in conjunction with a demonstrator registry for the vehicle and providing information related to the dealer associated with the dealer information in conjunction with the demonstrator registry for the vehicle when registered as the demonstration vehicle,
  wherein in response to the registering the demonstration vehicle, activating performance services of the demonstration vehicle, wherein the performance services include at least one of: performance report, vehicle snapshot, remote vehicle information, or Over-the-Air (OTA) updates and upgrades.

14. The system of claim 13, further including a deactivation engine, wherein the deactivation engine deactivates a registered demonstration vehicle to be removed from a list of dealer demonstration inventory.

15. The system of claim 13, wherein the interactive interface engine includes one or more of an in-vehicle computer touch screen, an application for a smart phone having an input capability, a shared messaging service, a web page, a web-based hyperlink, and an email requiring a response.

16. The system of claim 13, wherein the subscription-based events include one or more of a for-fee application, for-free application, music service, emergency service, safety and notification service, diagnostic service, reporting service, maintenance service, in-car application, mobile application, and remote application.

17. A non-transitory computer-readable medium having stored thereon computer-executable instructions for use in an automotive sales network for registering, deregistering and managing a dealer's vehicles as demonstration vehicles; the instructions, in response to execution, cause one or more processors to perform operations:
  receiving, via an interactive interface, an instruction for registering, deregistering and managing vehicles of a dealer as demonstration vehicles;
  receiving predetermined dealer information of a dealer and vehicle information of one or more vehicles requested to be registered, deregistered or managed as a demonstration vehicle, from a registered user;
  transmitting the received predetermined dealer information of the dealer and vehicle information of the one or more vehicles to an authentication engine;
  comparing location of the vehicle with an authorized geolocation database by the authentication engine;
  receiving verification of registration, de-registration and management qualification of at least one of the one or more vehicles by the registered user from the authentication engine;
  activating, deactivating, or amending registration of at least one of the one or more vehicles as a demonstration vehicle;
  receiving customer information and dealer information;
  activating one or more subscription-based events associated with the customer information in conjunction with a demonstrator registry for the vehicle when registered as the demonstration vehicle;
  providing information related to the dealer associated with the dealer information in conjunction with the demonstrator registry for the vehicle when registered as the demonstration vehicle; and
  in response to the activating, deactivating, or amending registration, activating, deactivating, or amending, respectively, performance services of the demonstration vehicle, wherein the performance services include at least one of: performance report, vehicle snapshot, remote vehicle information, or Over-the-Air (OTA) updates and upgrades.

18. The non-transitory computer-readable medium of claim 17, wherein the interactive interface includes at least one of: a user interface for an in-vehicle computer running an application on which at least some of the computer-executable instructions are executed, a user interface for a smart phone running an application on which at least some of the computer-executable instructions are executed, a shared messaging service, a web page running the application on which at least some of the computer-executable instructions are executed, a web-based hyperlink, and an email requiring a response, and wherein the one or more networked resources includes at least one data source having vehicle information or customer information accessible by the vehicle registration network.

19. The non-transitory computer-readable medium of claim 18, wherein the interactive interface includes registered subscription services options available for remote utilization on the one or more vehicles once registered as a demonstration vehicle.

20. The non-transitory computer-readable medium of claim 17, wherein the interactive interface resides on a device which comprises any type of computer-based device, appliance, terminal, remote controlling device, or wireless asset.

21. The non-transitory computer-readable medium of claim 17, wherein the authentication engine is a remote server configured to provide secure communication with the vehicle to be registered and an application on which at least some of the computer-executable instructions are executed, the registered user being logged onto the application.

22. The system of claim 13, further including a reporting engine to generate one or more reports in response to data from one or more of the authentication engine and the registration engine.

* * * * *